United States Patent

Hoyes et al.

[11] Patent Number: 6,105,596
[45] Date of Patent: Aug. 22, 2000

[54] SEALING SYSTEM

[75] Inventors: John R. Hoyes, Littleborough; Liam C Thorpe, Rochdale, both of United Kingdom

[73] Assignee: Flexitallic Investments, Inc., Houston, Tex.

[21] Appl. No.: 09/077,570
[22] PCT Filed: Sep. 25, 1997
[86] PCT No.: PCT/GB97/02623
  § 371 Date: Sep. 30, 1998
  § 102(e) Date: Sep. 30, 1998
[87] PCT Pub. No.: WO98/14724
  PCT Pub. Date: Apr. 9, 1998

[30] Foreign Application Priority Data

Oct. 1, 1996 [GB] United Kingdom ............... 9620438

[51] Int. Cl.[7] .................. F16K 41/04; F16J 15/22; F16J 15/24
[52] U.S. Cl. .................. 137/15.17; 137/15.18; 251/214; 277/308; 277/346; 277/510; 277/536; 277/539; 277/540
[58] Field of Search ................... 137/15, 15.17, 137/15.18; 251/214; 277/346, 510, 529, 536, 539, 540, 308, 370

[56] References Cited

U.S. PATENT DOCUMENTS 3,126,207  3/1964  Eikelberner ............... 277/346
4,328,974  5/1982  White et al. ............... 251/214

FOREIGN PATENT DOCUMENTS 1 070 461  12/1959  Germany .
93 01 219 U  3/1993  Germany .
2 255 141  10/1992  United Kingdom .
WO 81/02454  9/1981  WIPO .

Primary Examiner—George L. Walton
Attorney, Agent, or Firm—Robert C. Shaddox; Winstead Sechrest & Minick P.C.

[57] ABSTRACT

A sealing assembly with a first molded graphite ring of generally triangular cross section, one side of which is in use perpendicular to the longitudinal axis of a rotatable and/or slidable shaft, the surface of which is to be sealed in an axial direction against fluid leakage therealong, and a second side which is in use disposed parallel to said shaft to engage the inner wall of the housing surrounding said shaft. The invention further comprises a second molded graphite ring of generally triangular cross section and of generally similar dimensions to the first molded ring, with the second ring being in use installed in inverted relationship to the first ring to define there between an axially extending void around said shaft together with a third molded graphite ring having a triangular cross section and installed between said and first and second rings to substantially completely fill said void prior to the application of axial pressure to said rings to develop a sealing force between the inner wall of said housing and said shaft. The combination relates to fluid sealing and is in particular concerned with sealing against leakage along rotating or rotatable shafts, or reciprocating and/or reciprocable shafts.

27 Claims, 1 Drawing Sheet

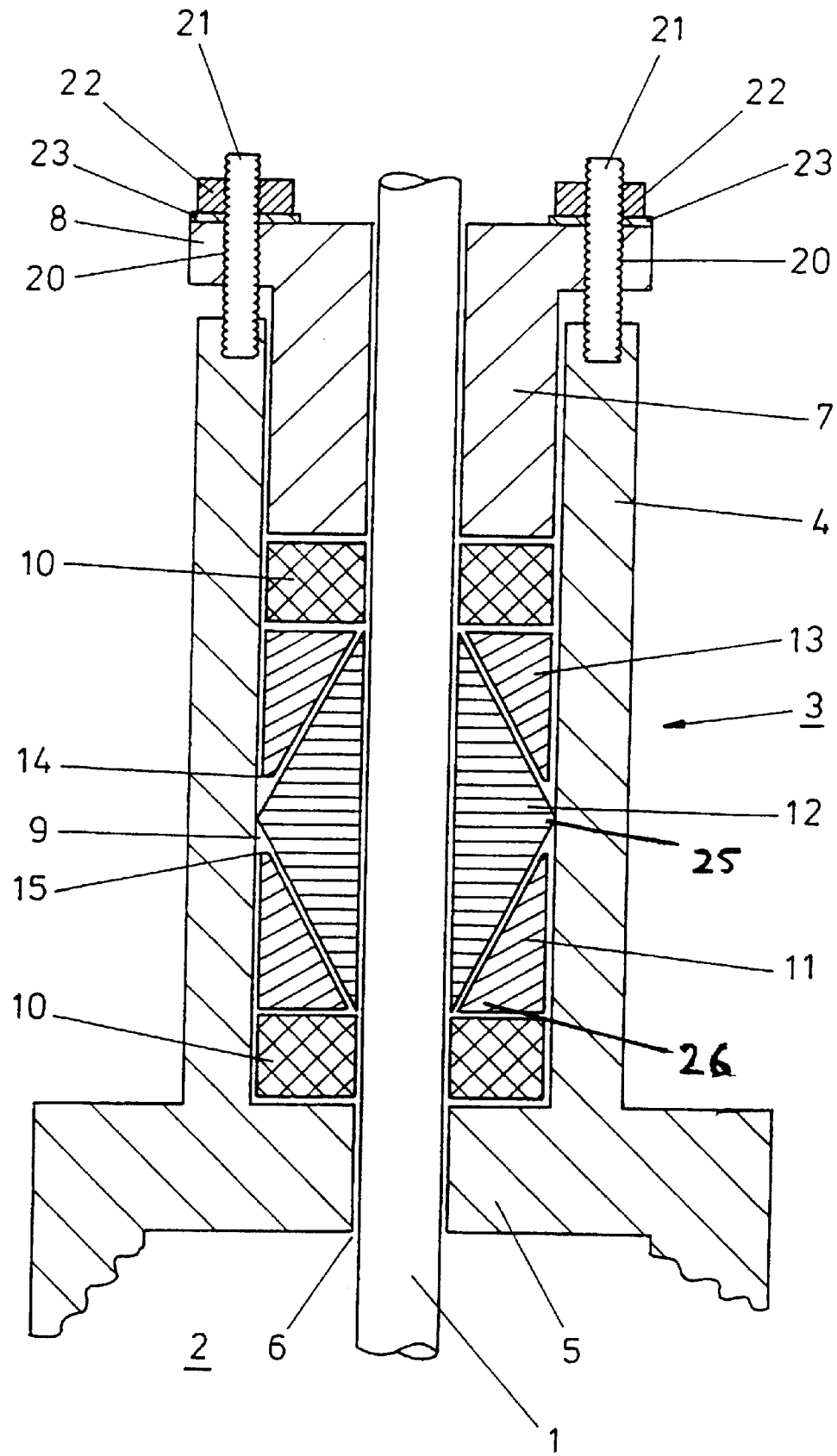

SEALING SYSTEM

This invention relates to fluid sealing and is in particular concerned with sealing against leakage along rotating and/or rotatable shafts, or reciprocating and/or reciprocable shafts.

Fluid control valves present a significant sealing problem due to conflicting requirements. The fluid seal on the valve actuator shaft must be effective, but not so physically tight as to make operation of the valve excessively difficult. Furthermore, because of the indeterminate frequency of operation, the shaft seal must be capable of maintaining a satisfactory seal both during operation and before and afterwards in periods of protracted idleness.

Of course, packings and/or seals for such applications have been in common use for many years. Traditional gland seals for valve stems and sliding/rotating shafts have used essentially textile materials such as ropes and braids, usually impregnated with a lubricant/sealing composition. For example, braided packings having a generally square cross-section and impregnated with a material such as PTFE or a graphite composition are widely used. A measured length of the braid is formed into a ring and a number of these rings are packed into an open-topped chamber encircling the shaft which is to be sealed. The chamber, or "stuffing box" is then closed, sometimes by means of a screw-threaded adaptor but more usually by means of a gland follower which is retained by a stud follower which is retained by stud bolts and nuts, the tightening of which applies pressure to the rings of braid in the chamber.

Some of the axial pressure is converted into radial pressure on the shaft and it is this radial pressure which creates a seal. Unfortunately, because of the geometry inherent in such a simple system, the actual amount of radial pressure developed is suitable only for use in relatively low pressure applications, or where the mobility of the fluid being sealed is not that great. But for gases under high pressure, the simple traditional stuffing box technique is unsatisfactory, because there are obvious limits to the axial pressure which can be employed without making it extremely difficult to rotate and or axially slide the shaft.

For these reasons, stuffing box designs have become much more complicated. Thus it has been proposed to replace conventional, impregnated braided packings with a set of rings moulded from graphite or a similar relatively conformable material. In order to increase the radial sealing pressure on the shaft, it has also been proposed to shape or contour the interface regions of abutting rings so that axial pressure is more efficiently converted to radial pressure. The use of wedge shaped rings has become popular in order to achieve this, as illustrated in numerous patents; see for example WO/81/02454.

However, whilst such wedge shaped rings are successful, they do not lend themselves to ease of manufacture, or ease of use, since it is possible to install them incorrectly, the angles between the mating faces of the individual rings being not the same. It is therefore an object of the present invention to provide a relatively simple packing assembly which is easy to manufacture/install.

According to the present invention, a rotary and/or sliding shaft seal adapted for use in a stuffing box comprises a first moulded graphite ring of generally triangular cross-section, one side of which is in use generally perpendicular to the longitudinal axis of a rotatable and/or slidable shaft the surface of which is to be sealed in an axial direction against fluid leakage therealong, and a second side which is in use disposed generally parallel to said shaft to engage the inner wall of a housing surrounding said shaft, a second moulded graphite ring of generally triangular cross-section and of generally similar dimensions to the first moulded ring, said second ring being in use installed in inverted relation to the first ring to define therebetween an axially extending void around said shaft together with a third moulded graphite ring having a triangular cross-section and installed between said first and second rings to substantially completely fill said void prior to the application of axial pressure to said rings to develop a sealing force between the inner wall of said housing and said shaft.

Preferably the first and second rings are dimensioned so as to incline the third side of each of the two triangles so that when installed in the housing, it forms an angle of about 30° to the axis of the shaft, the third ring being dimensioned so as to exhibit a complementary apex angle of about 120°. It will be appreciated that in this preferred case, the cross-section of the third ring is constituted by an obtuse angled triangle whose longest side lies, in use, abuts against the surface of the shaft.

The first and second rings may have a higher density at a region radially inwards of the rings than the density of those rings at a radially outer region. Alternatively or additionally the third ring may have a higher density at a region radially outwards of the ring than the density of that ring at a radially inner region. The density of the first and second rings at a radially inwards region of those rings may be greater than the density of the third ring at a region radially inwards of the third ring. The third ring may have a greater density at a region radially outwards of the third ring than the density of the first and second rings at a radially outer region.

The first and second rings may be moulded from essentially square or rectangular cross-section annuli. The third ring may be moulded from essentially square or rectangular cross-section annuli.

The first and second rings may be of higher average density than the average density of the third ring.

Preferably the first and second rings are of a higher density than the third ring, all three rings being die moulded from essentially square or rectangular cross-section rings made by winding a graphite tape onto a cylindrical former prior to transferring them to an annular die wherein moulding to their final, triangular cross-section is carried out. A particularly preferred graphite tape comprises exfoliated graphite and has a density on the order of 1.0 g/cm$^3$. Preferably the final moulded density of the rings is in excess of 1.3 g/cm$^3$.

In the case of a typical third ring, and assuming the preferred cross-section with an approximately 120° apex angle, the long side of the moulded ring (the side in contract with the surface of the shaft) will have a length of about 3 to 4 times the width of the ring in a radial direction.

It has been found that by structuring the three rings in the preferred manner and moulding them from generally square or rectangular section rings wound from expanded graphite tape, the preferred density relationships can be generated by the die moulding operation to some extent or least substantially automatically.

Thus the long face of the third triangle, (the face which in use constitutes the face in contact with the shaft to be sealed) will exhibit a lower density and will therefore be more conformable relative to the first and second rings. But as the latter are also triangular, the action of compressing them against the third ring will generate radially inwardly directed forces in the latter, together with a corresponding outwardly directed force in the first and second rings, but in this latter case, against the surrounding housing. It has been found that this combination of relative densities and ring configuration is particularly advantageous, because it places the sealing forces in the most effective areas.

Thus it is relatively simple to seal against leakage along the static inner wall of the housing, so that the higher density first and second rings have a relatively easy task. But the critical area comprising the rotatable and/or slidable shaft is in contact with the maximum possible surface area of a lower density, more conformable material.

The arrangements so far discussed embrace only that part of the shaft seal which is constituted by graphite rings. According to a particularly preferred embodiment of the invention, the shaft seal of the present invention is provided with at least one header ring of a fibrous material, said header ring being in use engaged with one of the first and second rings. Preferably two such header rings are provided, one engaged, in use, with the first ring and one engaged, in use, with the second ring, in other words, at opposite ends of the set of graphite rings.

It is particularly preferred that the header rings comprise plaited carbon fibre yarns, preferably impregnated with PFTE and/or a high viscosity lubricant material. Advantageously, the carbon fibre yarns comprise nominal 6 micron diameter stretch-broken fibres, preferably of a low sodium content.

The latter has been found to improve thermal stability whilst the former ensures that the plaited packing has relatively low permeability. This in turn ensures that a minimal amount of PTFE is required for impregnation; this is important in preventing the PTFE from becoming a physically dominant element in the header rings, where mechanical and thermal stability is a prime requirement.

According to a further aspect of the present invention a method of sealing a rotary and/or sliding shaft in a stuffing box with a seal, which seal comprises a first moulded graphite ring of generally triangular cross-section, one side of which is generally perpendicular to the longitudinal axis of the rotatable and/or slidable shaft the surface of which is to be sealed in an axial direction against fluid leakage therealong, and a second side which is disposed generally parallel to said shaft to engage the inner wall of a housing surrounding said shaft, a second moulded graphite ring of generally triangular cross-section and of generally similar dimensions to said first moulded ring, said second ring being installed in inverted relation to the first ring to define therebetween an axially extending void around said shaft, together with a third moulded graphite ring having a triangular cross-section installed between said first and second rings to substantially completely fill said void comprises applying axial pressure to said rings to develop a sealing force between the inner wall of said housing and said shaft.

The method may comprise axial pressure on said first and second rings increasing the density of said third ring in the region of the third ring which borders said first and second rings to be greater than the region of a third ring that borders said shaft.

The first and second rings may have a greater density at a radially inner region than the radially inner region of the third ring whereby axial pressure between said first and second rings causes the axially inner regions of the first and second rings to bias radially inner regions of the third ring into sealing engagement with the shaft. The third ring may have a greater density at a radially outer region than radially outer regions of the first and second rings whereby axial pressure between said first and second rings causes the axial outer region of said third ring to bias radially outer regions of said first and second rings into sealing engagement with the housing.

The present invention includes any combination of the herein referred to features or limitations.

It will be appreciated that the header rings have a very significant role to play in the complete seal assembly, because it is through them that axial pressure is applied to the graphite rings.

In order that the invention be better understood a preferred embodiment of it will now be described by way of example with reference to the accompanying drawing, in which: the sole FIGURE is a cross-sectional side view through a shaft seal assembly incorporating a rotary and/or sliding shaft seal according to the present invention.

In the FIGURE an actuator operating shaft 1 extends from a chamber 2 which in use contains fluid at a pressure considerably higher than atmospheric to a region of considerably lower, typically atmospheric pressure through a stuffing box 3. The latter is constituted by a generally cylindrical wall having at one end a base wall 5 and an aperture 6 defined therein through which the shaft 1 passes freely into the chamber. At the opposite, otherwise open end of the stuffing box, there is a gland closure 7 having a head 8 which is provided with a plurality of apertures 20 through which stud bolts 21 extend from the stuffing box hardware. Nuts 22 are employed in conjunction with plain washers 23 to retain the closure 7 in place and at the same time to facilitate the application or axially directed pressure onto a seal assembly (described below) in the stuffing box. The gland closure 7 and its head 8 have a central aperture defined therein through which the shaft 1 passes freely. The cylindrical wall, the base wall 5 and the confronting face of the closure 7 together thus define a cylindrical chamber 9 surrounding the shaft 1. To at least minimize fluid leakage along the shaft 1 from the chamber 2, the chamber 9 is provided with a seal assembly comprising a pair of header rings 10 and three graphite rings 11, 12 and 13 respectively.

The graphite rings 11 and 13 are triangular in cross-section and are assembled with confronting apices abutted against the cylindrical wall 4 and in close proximity to one another, although in this particular example, the apices themselves are slightly truncated, at 14 and 15 respectively, to prevent those rings abutting each other on application of axial pressure. The triangular cross-sections in this instance are selected such that the hypotenuse of each triangular section inclined at 30° to the longitudinal axis of the shaft 1, the adjacent sides being respectively normal to and parallel to this axis.

Interposed between the rings 11 and 13 is a third ring 12 which is constituted by an obtuse angled triangle having an apex angle of 120°, and which substantially fills the triangular annulus defined between the first two triangles and the shaft 1, the base of the third triangle being in contact with the shaft 1. Although the apex angle is shown as being 120° any suitable angle could be chosen such as 60° or 90°, with the angles on the first two triangles being altered accordingly to ensure abutment along adjacent faces.

All 3 rings were conventionally made by die moulding from a generally rectangular section annulus formed by winding an expanded graphite tape onto a cylindrical former. The expanded graphite tape has a density of about 1.0 g/cm$^3$. After moulding, the average density was in excess of 1.6 or 1.3 g/cm$^3$. The rings 11 and 13 may have a greater average density than the ring 12. The header rings were plaited from nominal 6 micron diameter stretch broken carbon fibre yarns impregnated with PTFE in the form of a dispersion and containing some high viscosity lubricant. Only sufficient PTFE and lubricant was included to permit satisfactory plaiting to be carried out. As a result, the functional load-bearing performance of the header rings is based on direct contact with the carbon fibres, not through a PTFE coating or intermediate layer.

The rings 11, 12 and 13 will not have an even density throughout their cross-sectional area. In this respect, the third ring 12 may be formed as a cylindrical section before being axially or radially compressed or both in the die moulding to reach the shape shown. The cut tape can be 1.6 to 1.8 times the width of the finished rings, prior to compression. It can be seen that radially outermost region 25 of the ring 12 will have been axially compressed to a greater extent than the radially inner region, to give a greater density at the region 25 with the density decreasing radially inwards of that ring. Similarly the radially inner region 26 of the rings 11 and 13 will have been compressed more than the radially outer region to give the radially inner region 26 a greater density.

Alternatively or additionally, the regions 25 and 26 may be made of greater density by winding graphite tape of different density at those regions or by including more graphite tape at those regions prior to compression in the moulds. Thus the variation in density can be exaggerated.

In use, the gland closure 7 was forced down by tightening the nuts 22, thereby reducing the volume of the chamber and applying axial pressure through both header rings 10 onto the 3 graphite rings. Because of the cooperating complementary shapes of these, the axial pressure is in part converted to radial pressure against the cylindrical wall 4 and at the same time against the shaft 1. But because of the configuration/geometry, the side of the triangular section ring 12 abutting the shaft 1 will tend to retain a lower density than the regions bordering the interfaces between rings 11 and 13. As a result, the side of ring 12 which abuts the shaft 1 will tend to be more readily conformable to the shaft surface and is compressed against the shaft by the more dense regions 26 of the rings 11 and 13 and because of the relatively high shaft surface area contacted by the ring 12, the sealing performance is enhanced over that which might be achieved with rectangular section rings or with conventional plaited packings. Furthermore, an additional seal is formed as the relatively dense region 25 of the ring 12 is acted upon by the relatively soft regions of the radially outer parts of the rings 11 and 13 to force the soft regions outwardly to seal firmly against the inner walls of the box 3.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A rotary or sliding shaft seal adapted for use in a stuffing box comprising a first molded graphite ring (11) of generally triangular cross-section, one side of which is, in use, generally perpendicular to the longitudinal axis of a rotatable or slidable shaft (1), the surface of which is to be sealed in an axial direction against fluid leakage therealong, and a second side which is in use disposed generally parallel to said shaft to engage the inner wall of a housing (4) surrounding said shaft (1), a second molded graphite ring (13) of generally triangular cross-section and of generally similar dimensions to said first molded ring (11), said second ring (13) being, in use, installed in inverted relation to the first ring to define there between an axially extending void around said shaft, together with a third molded graphite ring (12) having a triangular cross-section and installed between said first and second rings (11, 13) to substantially completely fill said void prior to the application of axial pressure to said rings to develop a sealing force between the inner wall of said housing (4) and said shaft (1).

2. The seal according to claim 1 wherein the first and second rings (11, 13) are dimensioned so as to incline the third side of each of the two triangles so that when installed in the housing, it forms an angle of about 30° to the axis of the shaft, the third ring (12) being dimensioned so as to exhibit a complementary apex angle of about 120°, said third ring being constituted, in section, by an obtuse angle triangle whose longest side abuts against the surface of the shaft.

3. The seal according to claim 1 wherein the first and second rings have a higher density at a region radially inwards of the rings than the density of those rings at a radial outer region.

4. The seal according to claim 1 in which the third ring has a higher density at a region radially outwards of the ring than the density of that ring at a radially inner region.

5. The seal as claimed in claim 1 in which the density of the first and second rings at a radially inwards region of those rings is grater than the density of the third ring at a region radially inwards of the third ring.

6. The seal as claimed in claim 1 in which the third ring has a greater density at a region radially outwards of the third ring than the density of the first and second rings at a radially outer region.

7. The seal as claimed in claim 1 in which the first and second rings are molded from essentially square or rectangular cross-section annuli.

8. The seal as claimed in claim 1 in which the third ring is molded from essentially square or rectangular cross-section annuli.

9. The seal as claimed in claim 1 in which, the first and second rings are of higher average density than the average density of the third ring.

10. The seal according to claim 1 wherein said first, second and third rings (11, 12, 13) comprise expanded graphite tape.

11. The seal according to claim 1 wherein that face of the third ring which in use lies in contact with the shaft has a length axially of the shaft about 3 to 4 times the width of said rings in a direction radially with respect to the shaft (1).

12. The seal according to claim 1 wherein the confronting triangular apex regions of the first and second rings as seen in section are truncated (14, 15) so that on initial installation and prior to application of any pressure axially of the shaft, an annular gap is defined between them.

13. The seal according to claim 1 provided with at least one header ring (10) of a fibrous material, said header ring being engaged with the first (11) or second ring (13).

14. The seal according to claim 1 wherein two header rings (10) are provided, one header ring engaged, in use, with the first ring (11) and the second header ring engaged, in use, with the second ring (13).

15. The seal according to claim 13, wherein said header ring (10) comprises plaited carbon fibre yarns impregnated with a minor quantity of ptfe and/or a high viscosity lubricant.

16. The seal according to claim 14, wherein said header rings (10) comprise plaited carbon fibre yarns impregnated with a minor quantity of ptfe and/or a high viscosity lubricant.

17. The seal according to claim 15 wherein said carbon fibre yarns comprise approximately 6 micron diameter, stretch broker, carbon fibers.

18. The seal according to claim 16 wherein said carbon fibre yarns comprise approximately 6 micron diameter, stretch broker, carbon fibers.

19. The seal according to claim 15 wherein said carbon fibers have a low sodium content.

20. The seal according to claim 14 wherein said carbon fibers have a low sodium content.

21. The seal according to claim 1 wherein the stuffing box comprises a cylindrical housing having a base wall with an aperture defined therein through which said shaft extends freely, together with a closure engageable with an open opposite end of the housing to apply axial pressure to said seal whereby a radial sealing pressure is developed between the housing and the shaft, said closure having an aperture define therein through which said shaft extends.

22. The method of sealing a rotary or sliding shaft using a seal as claimed in claim 1.

23. A valve actuator shaft seal adapted for use in a stuffing box comprising a first molded graphite ring (11) of generally triangular cross-section, one side of which is, in use, generally perpendicular to the longitudinal axis of a rotatable or slidable shaft (1), the surface of which is to be sealed in an axial direction against fluid leakage therealong, and a second side which is in use disposed generally parallel to said shaft to engage the inner wall of a housing (4) surrounding said shaft (1), a second molded graphite ring (13) of generally triangular cross-section and of generally similar dimensions to said first molded ring (11), said second ring (13) being, in use, installed in inverted relation to the first ring to define there between an axially extending void around said shaft, together with a third molded graphite ring (12) having a triangular cross-section and installed between said first and second rings (11, 13) to substantially completely fill said void prior to the application of axial pressure to said rings to develop a sealing force between the inner wall of said housing (4) and said shaft (1).

24. A method of sealing a rotary or sliding shaft (1) in a stuffing box, with a seal, the seal comprising a first molded graphite ring (11) of generally triangular cross-section, one side of which is generally perpendicular to the longitudinal axis of the rotatable or slidable shaft, the surface of which is to be sealed in an axial direction against fluid leakage therealong, and a second side which is disposed generally parallel to said shaft (1) to engage the inner wall of a housing (4) surrounding said shaft, a second molded graphite ring (13) of generally triangular cross-section and of generally similar dimensions to said first molded ring, said second ring being installed in inverted relation to the first ring to define therebetween an axially extending void around said shaft, together with a third molded graphite ring (12) having a triangular cross-section and installed between said first and second rings (11, 13) to substantially completely fill said void the method comprising applying axial pressure to said first and second rings (11, 13) to develop a sealing force between the inner wall of said housing and said shaft.

25. The method as claimed in claim 24 comprising axial pressure on said first and second rings (11, 13) increasing the density of said third ring (12) in the region of the third ring (12) which boarders said first and second rings to be greater than the density of the third ring (12) in the region of that ring that borders said shaft (1).

26. The method as claimed in claim 24 in which the first and second rings have a greater density at a radially inner region than the radially inner region of the third ring whereby axial pressure between said first and second rings causes the axially inner regions of the first and second rings to bias radially inner regions of the third ring into sealing engagement with the shaft.

27. The method as claimed in any of claim 24 in which the third ring has a greater density at a radially outer region than radially outer regions of the first and second rings whereby axial pressure between said first and second rings causes the axially outer region of said third ring to bias radially outer regions of said first and second rings into sealing engagement with the housing.

* * * * *